US008758092B2

(12) United States Patent
Hu et al.

(10) Patent No.: US 8,758,092 B2
(45) Date of Patent: Jun. 24, 2014

(54) SWEEPER BURNISH HEAD (75) Inventors: Yong Hu, Fremont, CA (US); Eric K. Dahlini, San Jose, CA (US); Hamid F. Ghazvini, San Jose, CA (US); Pranesh K. Swamy, Tracy, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 11/281,166

(22) Filed: Nov. 16, 2005

(65) Prior Publication Data
US 2007/0111645 A1 May 17, 2007

(51) Int. Cl.
*B24B 39/00* (2006.01)

(52) U.S. Cl.
USPC ............... 451/63; 451/41; 451/290; 29/90.01

(58) Field of Classification Search
USPC ............. 451/63, 317, 318, 901, 41, 285, 290; 29/90.01, 603.07, 603.12, 603.16; 360/235.4
See application file for complete search history.

(56) References Cited

U.S. PATENT DOCUMENTS

| 4,845,816 | A | * | 7/1989 | Nanis | 29/90.01 |
|---|---|---|---|---|---|
| 4,870,519 | A | * | 9/1989 | White | 360/236.7 |
| 5,086,360 | A | * | 2/1992 | Smith et al. | 360/236.6 |
| 5,513,056 | A | * | 4/1996 | Kawasaki et al. | 360/236.9 |
| 5,636,085 | A | * | 6/1997 | Jones et al. | 360/236.6 |
| 5,644,960 | A | * | 7/1997 | O'Brien | 81/363 |
| 5,658,191 | A | * | 8/1997 | Brezoczky | 451/324 |
| 5,782,680 | A | * | 7/1998 | Pilsan | 451/317 |
| 5,841,608 | A | * | 11/1998 | Kasamatsu et al. | 360/236.6 |
| 5,926,344 | A | * | 7/1999 | Kimura | 360/236.7 |
| 5,963,396 | A | | 10/1999 | Burga et al. | |
| 5,980,369 | A | * | 11/1999 | Burga et al. | 451/317 |
| 6,183,349 | B1 | | 2/2001 | Burga et al. | |
| 6,230,380 | B1 | * | 5/2001 | Wang et al. | 29/90.01 |
| 6,273,793 | B1 | * | 8/2001 | Liners et al. | 451/41 |
| 6,296,552 | B1 | | 10/2001 | Boutaghou et al. | |
| 6,322,431 | B1 | | 11/2001 | Schaenzer et al. | |
| 6,503,132 | B2 | * | 1/2003 | Ekstrum et al. | 451/312 |
| 6,580,572 | B1 | | 6/2003 | Yao et al. | |
| 6,707,631 | B1 | * | 3/2004 | Haddock | 360/75 |
| 6,765,758 | B1 | * | 7/2004 | Cha | 360/236.1 |
| 6,935,925 | B1 | * | 8/2005 | Agrawal et al. | 451/8 |
| 7,094,129 | B2 | * | 8/2006 | Gillis et al. | 451/8 |
| 7,251,980 | B2 | * | 8/2007 | Gallentine et al. | 72/449 |
| 7,255,636 | B2 | * | 8/2007 | Hu et al. | 451/319 |
| 7,314,404 | B2 | * | 1/2008 | Singh et al. | 451/63 |
| 2002/0031987 | A1 | * | 3/2002 | Liners et al. | 451/41 |
| 2002/0126416 | A1 | * | 9/2002 | Smith | 360/128 |
| 2003/0090833 | A1 | * | 5/2003 | Tani et al. | 360/110 |
| 2003/0096558 | A1 | | 5/2003 | Zheng et al. | |

FOREIGN PATENT DOCUMENTS

EP    1003157 B1    8/2004

OTHER PUBLICATIONS

Australian Search Report, Application SG200607838-0, mailed Aug. 10, 2007.
Anonymous, Derwent Abstract Accession No. 92-022078/03, Class T03 RD 322064, Dec. 10, 1991.

* cited by examiner

Primary Examiner — Eileen P. Morgan (57) ABSTRACT

A skewed burnishing head arrangement is provided for burnishing the surface of a disc. The skewing of the burnishing head relative to the diameter perpendicular to a sweeping direction provides improved wiping action that catches loose particles and surface contamination, as well as performing aggressive asperity cutting and surface conditioning, while preventing particles from being embedded into a disc surface.

16 Claims, 6 Drawing Sheets

SWEEPER BURNISH HEAD

FIELD OF THE INVENTION

The present invention relates to disc drive systems, and more particularly, to method and apparatus for burnishing asperities or surface irregularities from the surface of a disc.

BACKGROUND OF THE INVENTION

In data processing systems, magnetic disc drives are often used as storage devices. In such devices, read/write heads located on a slider (or an air bearing) are used to write data on or read data from an adjacently rotating disc. The head is located either above or under the disc and isolated therefrom by a thin film of air. The thickness of the thin film of air depends on the disc's rotational speed and the shape of the air bearing surface. During drive operations, the fly height of the head continuously changes as the head pitches and rolls with the varying topography of the disc. If the quality of the disc or the read/write head is poor, occasional rubbing or sharp contact may occur between the disc and the head. Such contact may damage the head or the disc, which can cause a loss of valuable data.

To efficiently accommodate changes in disc data storage characteristics (i.e., ever-narrowing recording track widths and increases in linear magnetic recording density), the head fly height (or slider clearance) is progressively being decreased. These decreases in fly height can cause the contact frequency between disc and head to increase. To prevent damage to either the disc or head for such low slider clearance, it has been recognized that the surface of the disc should be very flat and free of bumps.

As the head/disc interface of the magnetic hard drive approaches the near-contact region, the number of the thermal asperities (TA's) detected by the magnetic heads is quickly rising to an unmanageable level. These thermal asperities not only render recording tracks unusable for data recording, but also degrade the magnetic heads and potentially could fail the entire drive. A thermal asperity results from the strong interaction between a flying head and a defect on the disc surface. The interaction can be either contact or non-contact as long as it induces a sudden change in the head/media spacing. Hence, reducing media defects is a key to ensuring good reliability of magnetic hard drives.

One procedure that has been used to flatten disc surfaces is a two-step glide/burnish process. Within such a process, a glide head is first flown over the disc surface to detect and record asperities high enough to potentially strike a flying read/write head and cause data errors or head crashes. The glide head typically includes an advanced air bearing (AAB) surface designed to enable a particularly low fly height that is lower than most read/write heads fly during normal conditions.

After the glide step is completed, a burnished sweep is performed to remove recorded asperities. The burnish sweep consists of actually contacting the asperities with burnish pads located on an air bearing surface of a flying burnish head, thereby leveling the height to a desired specification. The glide and burnish steps can be repeated to ensure all asperities have been properly reduced or removed.

Traditionally, the burnish head does not include an AAB surface design, resulting in large variances in fly height. Variations in the burnish step can ultimately lead to a decrease in data yield efficiency. However, a burnish head that includes a complex AAB surface and an inefficient configuration of burnish pads can also lead to yield loss.

Because of the tight fly control required for the glide process in the flight variation typical of the burnish head air bearing surface, the traditional burnish head is not suitable to be also used as a glide head. Thus, the glide/burnish process has relied on a lengthy two head process. Each switch between the glide and burnish steps requires use of a separate head.

The objective of the burnishing is to remove the loose and soft particles and asperities, cut defects and asperities and condition the media surfaces. However, the deteriorating wear and scratch resistance of the media surface due to thinning overcoats makes the surface more prone to particle imbedding. Therefore, there is a need for burnish heads to incorporate particle/surface contamination clearing air bearing stability (ABS) features for high performance magnetic media.

Traditional burnishing heads with waffle or elliptical types consist of discrete pads distributed over an entire air bearing surface. Due to the discrete nature of such pads, the heads lack the flying stability and show a large head-to-head variation in fly height, which makes it difficult or impossible to fine tune the aggressiveness of the media burnishing. In addition, such designs lack ABS features for complete and finishing wipes.

Figure 1:
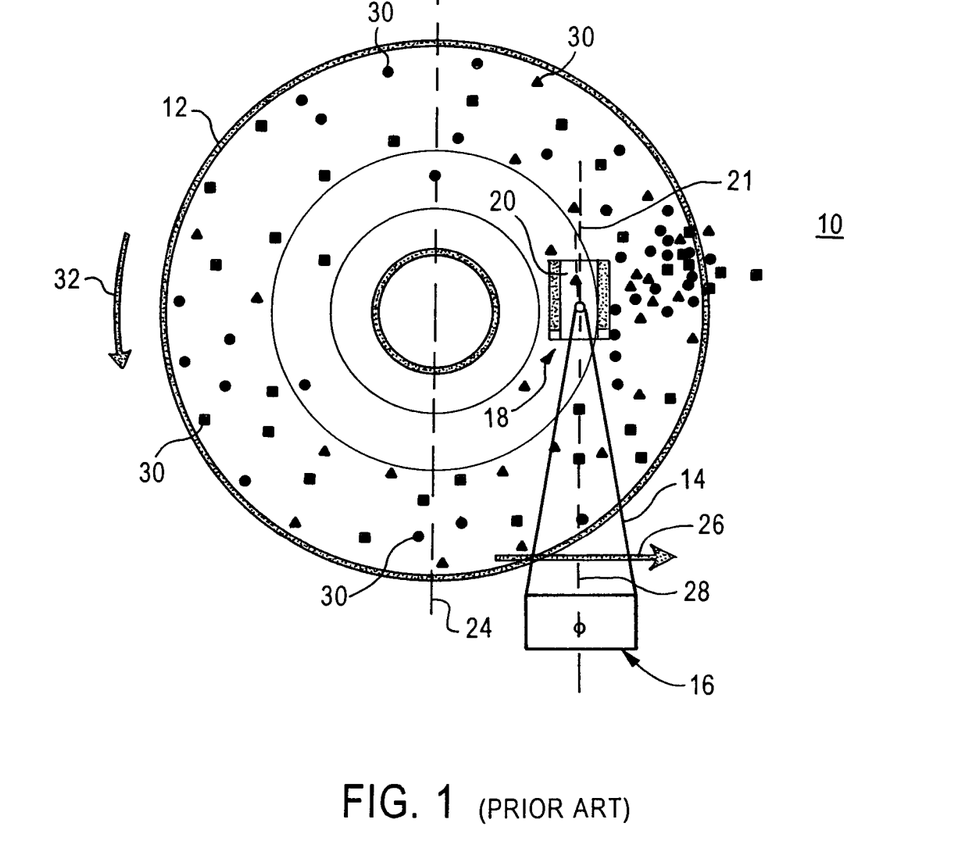
FIG. 1 is a schematic top view of a burnishing arrangement constructed in accordance with conventional designs.

A traditional burnish arrangement is depicted in FIG. 1, and lacks a completeness in the wiping action. Because of it, loose particles and surface contamination can easily escape burnishing rails especially in the cases of faster disc rotation and head speed. Such a head burnishing imposes a hard limit to production tests that is proportional to rotation speed and seeking rate. In addition, the conventional design lacks aggressiveness in asperity cutting and surface conditioning. During a burnishing action, the asperities and surface contaminations are encountered by a relatively gradual ABS surface. Also, as will be described with FIGS. 2A-2C, such head burnishing lacks a particle deflection, thereby increasing the likelihood of particle embedding.

FIG. 1 depicts a conventional arrangement 10 in which a disc 12 is mounted on a disc rotational mechanism. The disc 12 is rotated in the rotational direction indicated by arrow 32.

During burnishing operations, an arm 14 is moved with a seeking velocity, indicated by arrow 26. The arm 14 is translated at the seeking velocity by a translation mechanism (not shown in FIG. 1). The arm 14 has a first end 16 and a second end 18. At the second end 18 a burnishing head 20 is mounted and has a gradual ABS surface (not shown).

The disc 12 may be considered to have a diameter 24 to which a central longitudinal axis 28 of the arm 14 is parallel. The central longitudinal axis 21 of the burnishing head 20 is aligned with the central longitudinal axis 28 of the arm 14. The arm axis 28 and the burnishing head axis 21 are parallel to the diameter 24 of the disc 12. With a non-skewed design, such as depicted in conventional arrangement 10 of FIG. 1, during a sweeping operation the arm axis 28 and the burnishing head axis 21 are maintained substantially parallel to the diameter 24 of the disc 12. The asperities and particles 30 are swept by the burnishing head 20 during the burnishing process.

Figure 2A:
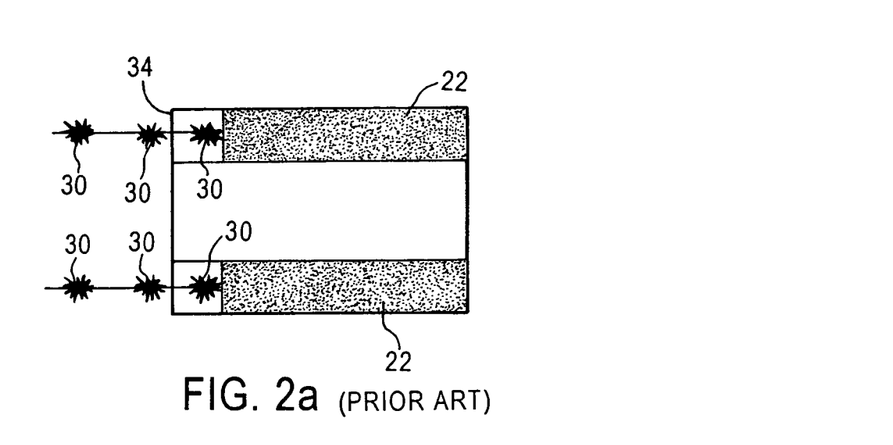
FIG. 2A depicts a bottom view of a burnishing head employed in the burnishing arrangement of FIG. 1.
Figure 2B:
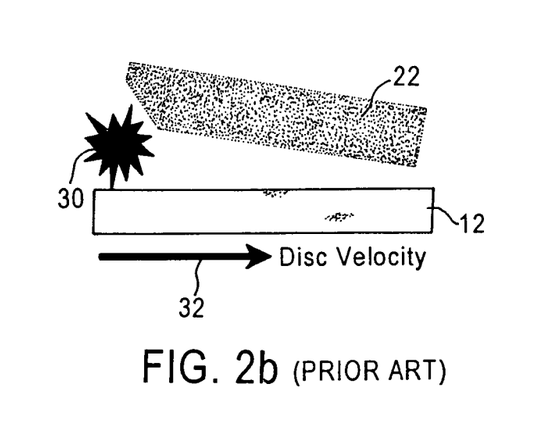
FIGS. 2B and 2C schematically depict a side view of an embedding of a particle during burnishing with the conventional arrangement of FIG. 1.
Figure 2C:
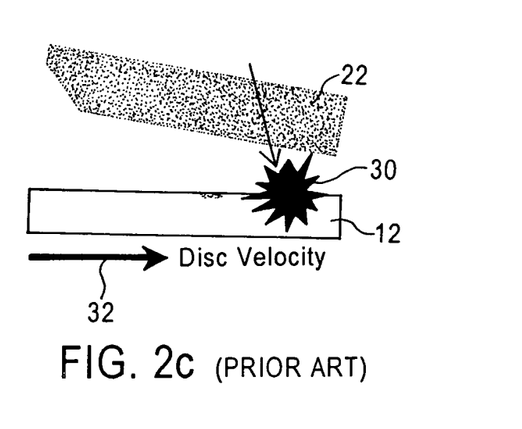

FIG. 2A shows the bottom surface of a burnishing head 20. The leading edge 34 is a tapered edge, as better seen in FIGS. 2B and 2C. Rails 22, provided as air bearing surfaces, exhibit the tapered front edge 34. The gradual air bearing surface, such as that depicted in FIGS. 2A-2C cause a particle 30 that is encountered to become embedded by contact with the burnishing head 20. Since the parallel configuration (i.e., "non-skewed" configuration") does not provide for particle deflection, there is an increased likelihood of particle embedding. The conventional non-skewed head burnish design lacks a complete wiping action so that loose particles and surface contamination can easily escape the burnishing rails, especially in cases of disc rotation and head sweep. This poses a limitation to production tests that is proportional to rotation speed and seeking rate.

SUMMARY OF THE INVENTION

There is a need for an improved burnishing arrangement increasingly required by ultra-smooth and ultra-thin overcoat magnetic media, achieving a more complete wiping of loose particles and surface contamination, more aggressive wedge cutting of asperities and surface conditioning and more efficient particle deflection. Further, there is a need for improved burnishing heads that attack defects and scrub and stir up surface contamination and loose particles on the surface, while providing an effective compression of the incoming air and creating a stable air bearing and consistent finishing wipe during a head seeking operation between the disc inner diameter and the disc outer diameter.

These and other needs are met by embodiments of the present invention which provide a method of burnishing a surface of a disc comprising rotating the disc and sweeping a burnishing head across the disc surface as a skewed angle. The earlier stated needs are also met by other embodiments of the present invention which provide a disc burnishing arrangement comprising a disc rotation mechanism that rotates a disc having a surface to be burnished. An arm is provided that is mounted to a translation mechanism that translates the arm in a direction perpendicular to a disc diameter. A burnishing head is attached to the arm and has a central longitudinal axis and rails with longitudinal axes, these rail axes being skewed relative to the disc diameter when the arm is translated.

The earlier stated needs are met by a still further embodiment of the present invention which provides a disc burnishing arrangement comprising a disc rotation mechanism that rotates a disc and means for burnishing the disc.

The earlier stated needs are met by a still further embodiment of the present invention which provides a disc burnish head comprising a slider having a bottom surface, a leading edge and a trailing edge. Side rails project from the bottom surface and extend substantially in parallel along two sides of the slider. A plurality of discrete disc burnish pads project from the bottom surface and form a matrix pattern between the side rails and extend substantially across the trailing edge.

The foregoing and other features, aspects and advantages of the present invention will become more apparent from the following detailed description when taken in conjunction with the accompanying drawings.

DETAILED DESCRIPTION OF THE INVENTION

The present invention addresses problems related to the burnishing of discs employed in disc storage, including those of removing particles, asperities, cutting defects and asperities and conditioning the media surfaces with reduced particle embedding. This is achieved, at least in part, by arrangements and methods of the present invention which provide for the sweeping of the burnishing head across the disc at a skewed angle. A skewing of the arm to which the burnishing head is attached causes the burnishing head to be skewed relative to a disc diameter perpendicular to the sweeping direction. This achieves a more complete wiping of loose particles and surface contamination, a more aggressive wedge cutting of asperities and surface conditioning, as well as more efficient particle deflection than conventional non-skewed head burnish arrangements. Employing a burnishing head with a continuous rail edge provides for a wedge cutting that is more efficient than non-skewed arrangements.

Figure 3:
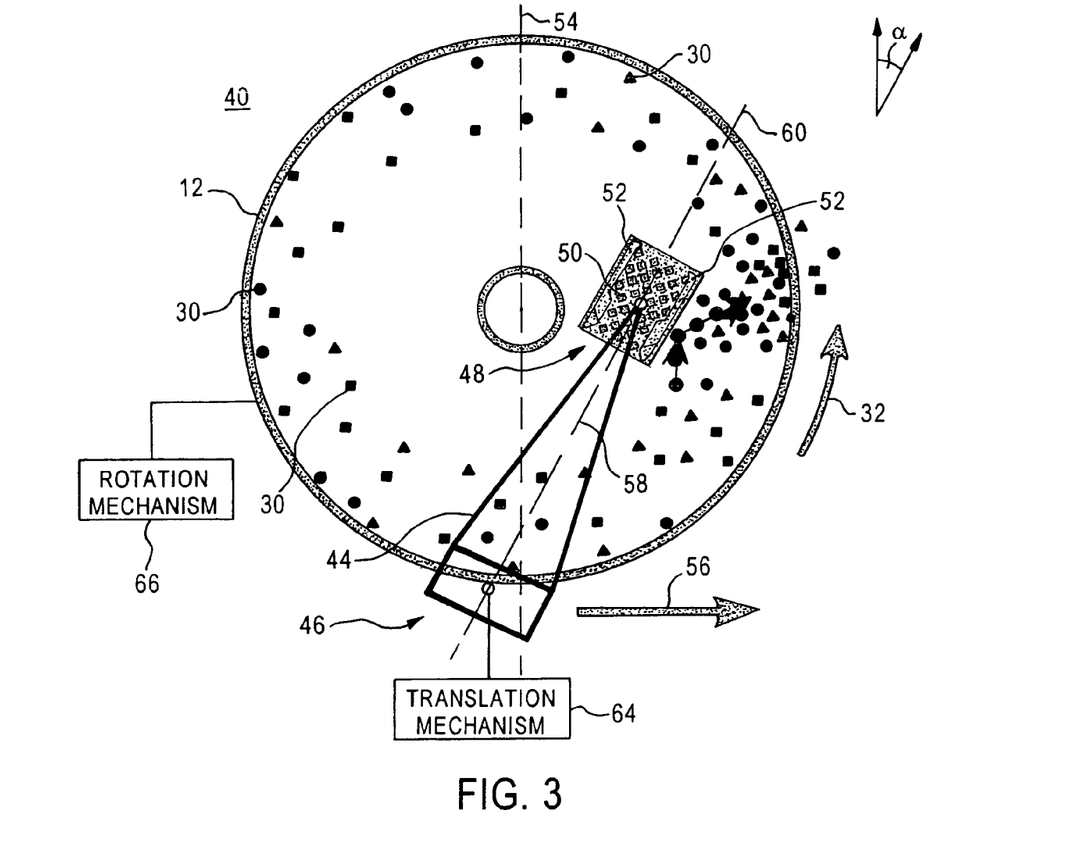
FIG. 3 is a top view of a burnishing arrangement constructed in accordance with embodiments of present invention.

FIG. 3 is a top view of a skewed head burnish design arrangement in accordance with embodiments of the present invention. The arrangement is schematically depicted so as not to obscure the present invention. The arrangement 40 has a rotation mechanism 66 (schematically depicted) that rotates a disc 12 whose surface is to be burnished. A plurality of asperities, particles, etc. 30 are shown as being on the surface of the disc 12.

An arm 44 has a first end 46 and a second end 48 on which a burnishing head 50 is attached. In a burnishing operation, the arm 44 is translated in a sweeping direction 56, as indicated by the arrow. The rotational direction of the disc 12 is referenced by arrow 32. A translation mechanism 64 is indicated schematically and serves to translate the arm 44 in the sweeping direction 56. However, it should be apparent to those of ordinary skill in the art that the motion is relative such that the disc 12 may be moved with respect to the arm 44, or the arm 44 may be moved with respect to the disc 12. Hence, referring to the arm being translated in a sweeping direction may be considered to include both the arm being moved or the disc being moved.

The burnishing head 50 has a pair of side rails 52 (seen in more detail in later figures) and a central longitudinal axis 60. In the embodiment of FIG. 3, the central longitudinal axis 60 of the burnishing head 50 is aligned with the arm axis 58.

In contrast to the non-skewed arrangement of FIG. 1, the skewed arrangement of FIG. 3 in accordance with embodiments of the present invention exhibits a skewing of the burnishing head axis 60 with respect to the diameter 54 of the disc 12, this diameter 54 being perpendicular to the sweeping direction 56. The skewing angle α is between about 5° to about 30° in certain embodiments, between about 10° to about 25° in certain other embodiments and is between about 15° to about 20° in especially preferred embodiments.

The skewing of the burnishing head 50 with respect to the diameter 54 of the disc 12 is maintained as the arm 44 is translated in the sweeping direction 56, in exemplary embodiments of the present invention. The skewing can be achieved at an ABS (air bearing stability) level, an HGA (head gimbal assembly) level or a tester fixture/cartridge level. The tester level is most desirable, because of the decoupling of skewed-head burnished performance and ABS design/HGA processes. In such embodiments, an in-situ adjustment in the skew angle may be made to change the angle at the first end 46 of the arm 44.

The skewed head burnishing of the present invention is considered to create a more complete wiping action that catches loose particles and surface contaminations, employing the skewed air bearing stability rails. This improved and complete wiping action removes the loose particles and surface contaminations.

Another improvement provided by the skewed-head burnishing arrangement 40 of the present invention is the very aggressive asperity cutting and surface conditioning that is provided. The slider/rail edges of the rails 52 form effective wedges. The aggressiveness of the asperity cutting is further enhanced due to the lower fly height that is achieved because of the skewing of the air bearing. There is a less efficient compression of incoming air with a skewed air bearing versus a non-skewed air bearing.

Figure 4:
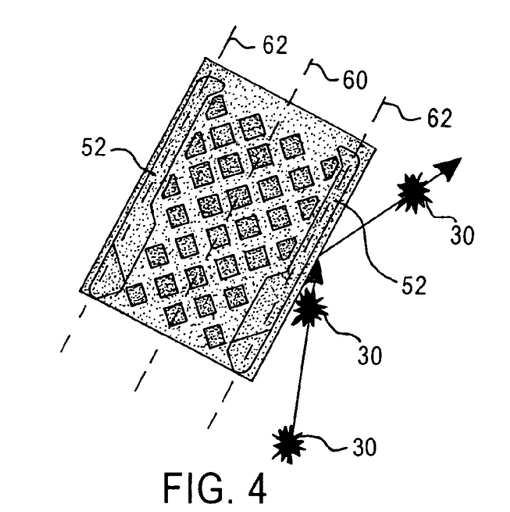
FIG. 4 shows a burnishing head in isolation to depict the deflection features in accordance with embodiments of the present invention.

Another improvement produced by the skewed burnishing head arrangement 40 of FIG. 3 is the deflection action created by the skewed slider/rails. Deflection action prevents loose particles from being embedded into the disc surface, such as shown in prior art FIGS. 2b and 2c. Instead, refer to FIG. 4, which depicts in isolation a burnishing head constructed in accordance with embodiments of the present invention and presented at a skewed angle. The particle 30 deflects off the skewed rails 52. The axes 62 of the rails are skewed at the skewing angle α (e.g. about 15° to about 20°) with respect to the diameter 54 that is perpendicular to the sweeping direction 56.

Figure 5:
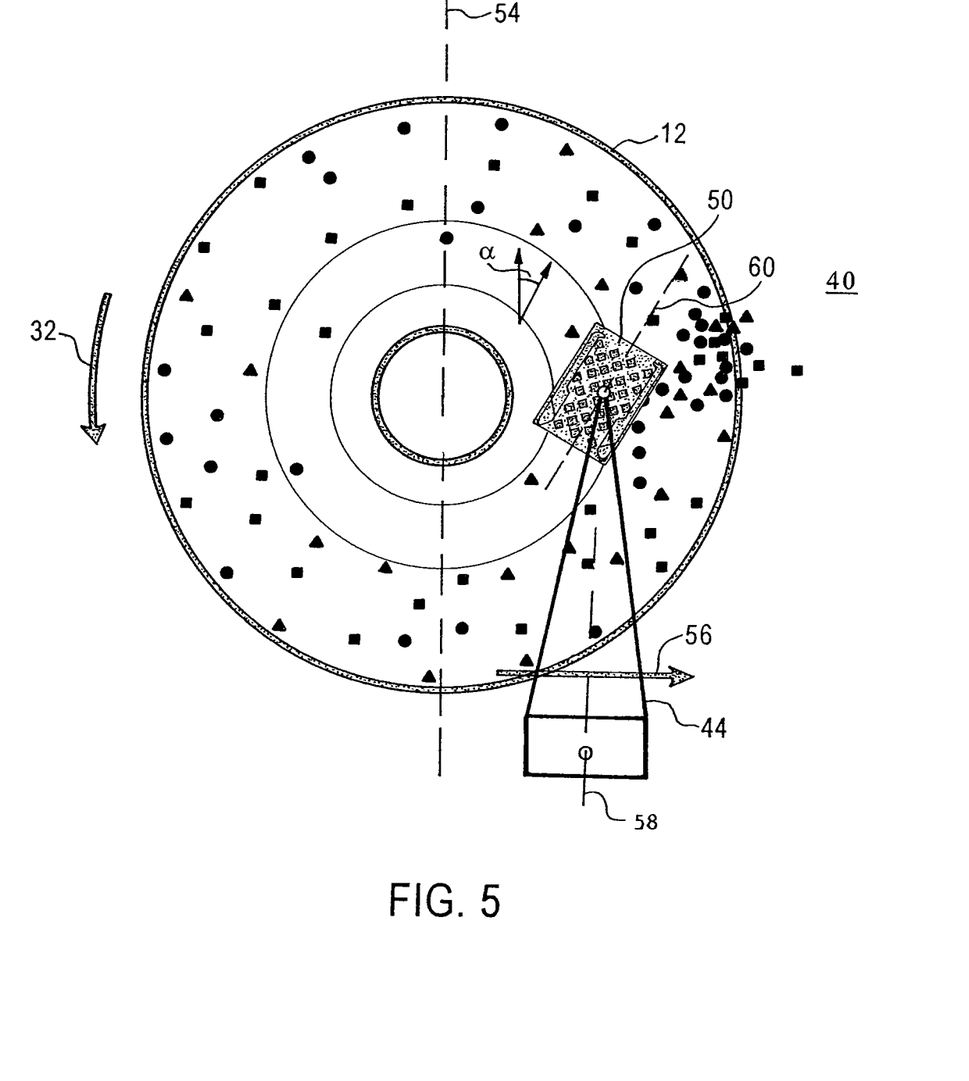
FIG. 5 is a top view depicting another embodiment of a burnishing head arrangement in accordance with the present invention.

FIG. 5 shows another embodiment of the present invention in which the arm axis 58 and the burnishing head axis 60 are not aligned. In this exemplary embodiment, the arm axis 58 is parallel to the diameter 54 and is perpendicular to the sweeping direction 56. The burnishing head axis 60, however, is set by the head gimbal assembly at the angle α (the skew angle) with respect to the diameter 54 that is perpendicular to the sweeping direction 56. As the arm 44 is translated in the sweeping direction 56, the burnishing head axis 60 maintains its skewed angle relative to the diameter 54 that is perpendicular to the sweeping direction 56.

The disc rotation mechanism 66 controls the speed of rotation on the disc, which may have an effect on the burnishing with the skewed angle arrangement of the present invention. In certain embodiments of the invention, the disc is rotated at between about 500 ips to about 1500 ips during the sweeping. In certain preferred embodiments of the invention, the disc is rotated at about 1100 ips during the sweeping.

Figure 7:
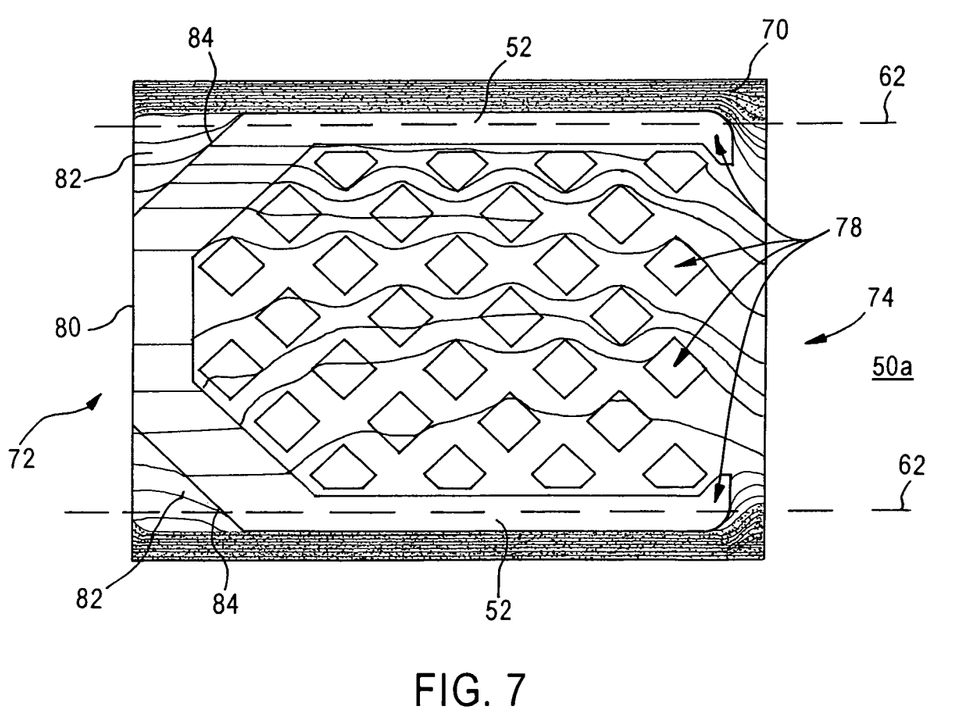
FIG. 7 is a bottom view of the burnishing head of FIG. 6.
Figure 8:
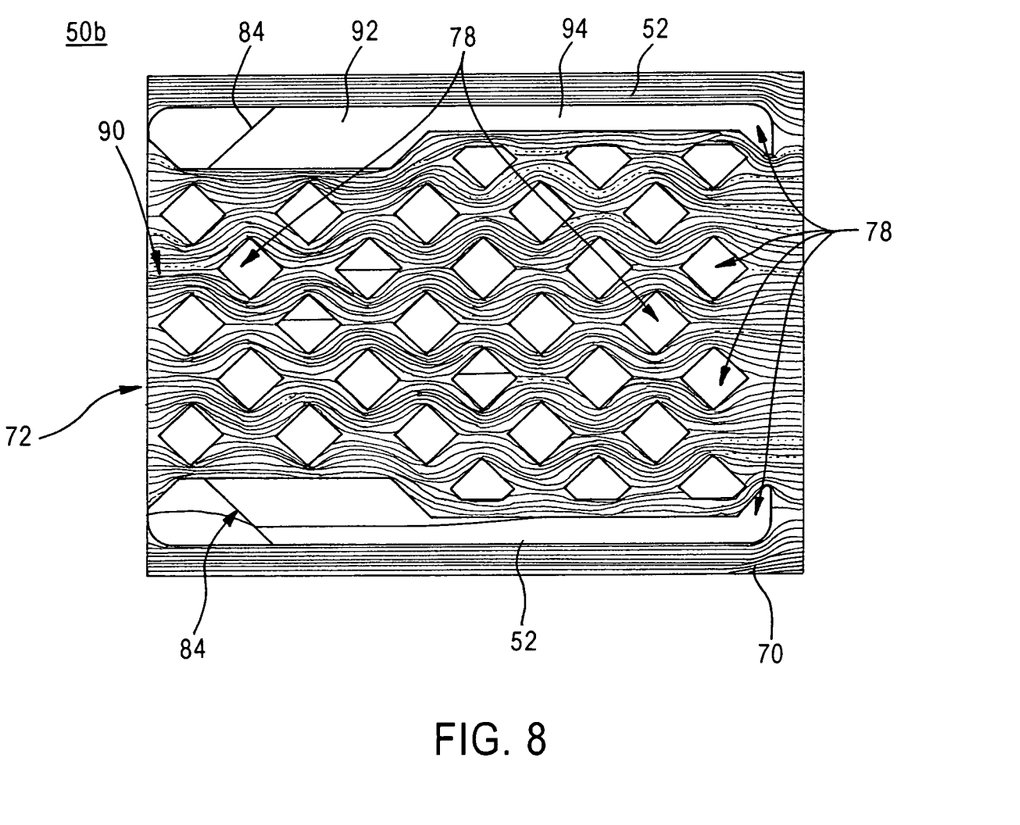
FIG. 8 is a bottom view of a burnishing head formed in accordance with other embodiments of the present invention.

A number of different designs for the burnishing head may be employed without departing from the scope of the present invention. However, FIGS. 6-8 depict embodiments of a burnishing head that find particular utility in the present invention for burnishing.

Figure 6:
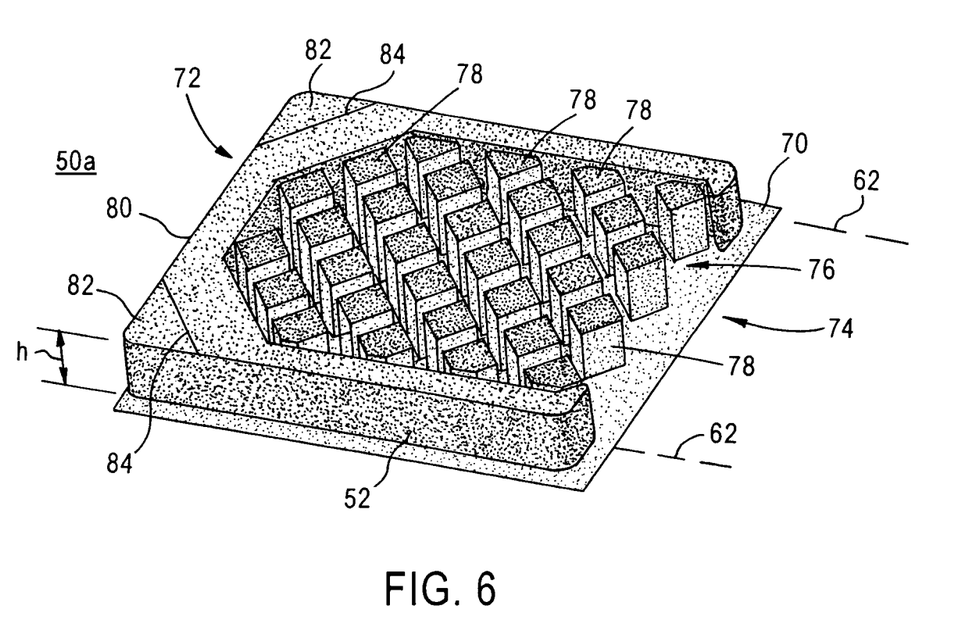
FIG. 6 is a perspective view of a burnishing head in accordance with embodiments of the present invention.

FIG. 6 depicts a perspective view of a first embodiment of a burnishing head 50a. FIG. 7 depicts the embodiment of FIG. 6 in a bottom schematic view. The burnishing head 50a has a bottom surface 70 from which the ABS and cutting and conditioning features project. Extended side rails 52 extend along substantially the entire length of the burnishing head 50a. The side rails 52 have central longitudinal axes 62, as discussed earlier. The extended side rails 52 provide edge wiping for a consistent finish-cleaning.

The extended side rails 52 are connected by a front wall 80 located at a leading edge 72 of the burnishing head 50a. The trailing edge 74 of the burnishing head 50a is open. The front wall 80 serves to block particles from entering the slider/burnishing head 50a. The front wall 80 interacts with passing defects prior to their reaching the matrix 76 of discrete pads 78. Because of this, the burnishing head embodiment 50A results in a slight decrease in burnishing aggressiveness as compared to the embodiment of FIG. 8, which will be described later.

In addition to the front wall 80, steps 82 are provided at the corners of the leading edge 72. Deflections are created by angled walls 84 to deflect particles away from the burnishing head 50a. One of the advantages provided by the present invention is the low probability of particles flying over the burnish pad and side rails, leading to a reduction in embedded particles. Further, due to edge wiping created by the extended side rails 52, there is a flushing out of accumulated particles.

In certain embodiments of the invention, the depth (or height) h of the cavity created by the side rails 52 is between about 4 μm and about 6 μm. Such depth has an effect on the flying characteristics of the burnishing pad, such as the suction force.

FIG. 8 depicts another embodiment of the burnishing head 50b in which a front wall 80 is not provided. Instead, a leading edge opening 90 is created between the extended side rails 52. An advantage of the open leading edge is a direct asperity cutting and conditioning by the matrix 76 of burnishing pads 78. Particles and defects are allowed to enter a burnishing head freely. Hence, because of the direct interaction of the matrix of burnishing pads 78 directly with the particles and defects, a very aggressive burnishing is accomplished. The extended side rails 52 act to provide a complete wiping action as in the embodiment of FIGS. 6 and 7. Further, the embodiment 50b includes side rails 52 that have a thicker portion 92 towards the leading edge and a thinner portion 94 towards the trailing edge when seen in bottom view, such as in FIG. 8.

Each of the burnishing heads 50a and 50b include extended continuous side rails and distributed burnishing pads 78. The burnishing pads 78 attack the defects and scrub and stir up surface contamination and loose particles on the surface of the disc 12. The side rails 52 provide an effective compression of the incoming air and create a stable air bearing and consistent finishing wipe during head seeking between the disc inner diameter and outer diameter. A consistent finishing wipe at the end of burnishing is critical in production where there exists substantial variation from discs and tester flash heads.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A method comprising:
   rotating a disc;
   sweeping a burnishing head across a surface of the disc; and
   removing contamination from the surface of the disc,
   wherein sweeping the burnishing head across the surface of the disc comprises translating the burnishing head in a direction perpendicular to a disc diameter, and
   wherein a central longitudinal axis of the burnishing head and the disc diameter form an angle between about 5° to about 30°.

2. The method of claim 1, wherein removing contamination from the surface of the disc comprises removing asperities, surface irregularities, and/or particles.

3. The method of claim 1, wherein the method is performed at an air bearing stability level, a head gimbal assembly level, or a tester fixture/cartridge level.

4. The method of claim 2, wherein the burnishing head comprises a means for deflecting particles, thereby decreasing the likelihood of embedding the particles in the disc surface.

5. The method of claim 1, wherein the burnishing head is mounted on an arm, and wherein translating the burnishing head comprises translating the arm.

6. The method of claim 5, wherein the arm comprises a central longitudinal axis, and further wherein the central longitudinal axis of the burnishing head and the central longitudinal axis of the arm are aligned.

7. The method of claim 5, wherein the arm comprises a central longitudinal axis, and further wherein the central longitudinal axis of the burnishing head and the central longitudinal axis of the arm are not aligned.

8. The method of claim 1, wherein the central longitudinal axis of the burnishing head and the disc diameter form an angle between about 10° to about 25°.

9. The method of claim 1, wherein the central longitudinal axis of the burnishing head and the disc diameter form an angle between about 15° to about 20°.

10. The method of claim 5, further comprising rotating the disc at between about 500 ips to about 1500 ips during the sweeping.

11. The method of claim 10, wherein the disc is rotated at about 1100 ips during the sweeping.

12. A disc burnishing arrangement, comprising:
a disc rotation mechanism operable to rotate a disc having a surface to be burnished;
an arm mounted to a translation mechanism operable to sweep the arm in a direction perpendicular to a disc diameter; and
a burnishing head attached to the arm, wherein a central longitudinal axis of the burnishing head and the disc diameter form an angle between about 5° to about 30°.

13. The arrangement of claim 12, wherein the central longitudinal axis of the burnishing head and the disc diameter form an angle between about 15° to about 20°.

14. The arrangement of claim 13, wherein the arm comprises a central longitudinal axis, and further wherein the central longitudinal axis of the burnishing head and the central longitudinal axis of the arm are aligned.

15. The arrangement of claim 13, wherein the arm comprises a central longitudinal axis, and further wherein the central longitudinal axis of the burnishing head and the central longitudinal axis of the arm are not aligned.

16. The arrangement of claim 15, wherein the burnishing head comprises extended continuous side rails and distributed burnishing pads.

* * * * *